United States Patent
Aldermeshian et al.

(10) Patent No.: US 6,993,043 B1
(45) Date of Patent: Jan. 31, 2006

(54) END-TO-END PRIORITIZED DATA DELIVERY ON NETWORKS USING IP OVER FRAME RELAY

(75) Inventors: Hrair Aldermeshian, Holmdel, NJ (US); Arvind S Chakravarti, Marlboro, NJ (US); Richard Hellstern, Cranbury, NJ (US); Raymond L. Kimber, Eatontown, NJ (US); Ali Mohammad Kujoory, Petaluma, CA (US); Yonatan Aharon Levy, Manalapan, NJ (US); John Babu Medamana, Colts Neck, NJ (US); John Joseph Sikora, Lincroft, NJ (US)

(73) Assignee: AT&T Corp., New York, NY (US)

( * ) Notice: Subject to any disclaimer, the term of this patent is extended or adjusted under 35 U.S.C. 154(b) by 720 days.

(21) Appl. No.: 09/711,549

(22) Filed: Nov. 13, 2000

(51) Int. Cl.
*H04L 12/66* (2006.01)

(52) U.S. Cl. ...................... 370/466; 370/469
(58) Field of Classification Search ................ 370/386, 370/389, 392, 395.63, 465, 466, 474, 252, 370/469
See application file for complete search history.

(56) References Cited

U.S. PATENT DOCUMENTS 5,519,640 A * 5/1996 Ganesan et al. ............ 709/236
5,699,521 A * 12/1997 Iizuka et al. ................ 709/240
5,734,654 A * 3/1998 Shirai et al. ................ 370/396
6,028,858 A * 2/2000 Rivers et al. ............... 370/352
6,081,507 A   6/2000 Chao et al.
6,081,524 A * 6/2000 Chase et al. ................ 370/389
6,144,669 A * 11/2000 Williams et al. ............ 370/401
6,331,980 B1 * 12/2001 Matsuo ...................... 370/395
6,363,053 B1 * 3/2002 Schuster et al. ............ 370/230
6,487,217 B1 * 11/2002 Baroudi ..................... 370/466
6,633,571 B1 * 10/2003 Sakamoto et al. .......... 370/401
6,658,021 B1 * 12/2003 Bromley et al. ............ 370/466

FOREIGN PATENT DOCUMENTS

EP        0 869 695 A1   10/1998
EP        0 889 667 A1    1/1999
WO       WO 01 97470 A   12/2001

* cited by examiner

*Primary Examiner*—Ricky Ngo
*Assistant Examiner*—Duc Duong

(57) ABSTRACT

The invention provides methods and systems for providing priority processing to critical data as the data is transmitted across a network. A plurality of Internet protocol (IP) packets, each of which contains data and priority information, are received at a first router. The data contained in the IP packets is then encapsulated into frame relay frames containing the priority information. The frame relay frames are transmitted from the first router to a frame relay network in a manner determined by the priority information included in the frame relay frames. The frame relay frames are then transmitted across a frame relay network to a second router in a manner determined by the priority information included in the frame relay frames.

3 Claims, 2 Drawing Sheets

END-TO-END PRIORITIZED DATA DELIVERY ON NETWORKS USING IP OVER FRAME RELAY

BACKGROUND OF THE INVENTION

1. Technical Field

The present invention relates to the field of transmission of data over networks. More particularly, the invention provides methods and systems that guarantee throughput of critical data by prioritizing end-to-end data delivery.

2. Related Information

FIG. 1 shows a typical configuration used to exchange data among three locations 100, 102 and 104. The transmission of data from locations 100 and 102 to location 104 will be described to reveal some of the problems associated with prior art networks. A first location 100 contains applications 106 and 108 that provide data to an Ethernet 110. Data is transmitted from Ethernet 110 to a first router 112. Likewise, applications 114 and 116 provide data to a second Ethernet 118 at location 102. Data is transmitted from Ethernet 118 to a second router 120. Routers 112 and 120 transmit data to a frame relay network 122.

Frame relay network 122 contains frame relay switches 124, 126 and 128. Routers 112 and 120 transmit data to frame relay switch 128 via frame relay switches 124 and 126 respectively. Finally, data is transmitted from frame relay switch 128 through a third router 130 and an Ethernet 132 to applications 134 and 136.

Conventional networks, such as the one shown in FIG. 1 have limited bandwidths and, therefore, limited data throughputs. Components such as routers and frame relay switches typically have lower bandwidths than the transmission lines used to connect the components. As a result, the overall throughput and quality of service of a network may be limited by the bandwidth of some of the components, especially the access links of routing and switching components. For example, congestion can occur at output port 138 of router 112 when Ethernet 110 transmits a relatively large number of packets containing data to router 112. Router 112 must encapsulate each of the data packets into a frame relay frame and transmit the frame relay frames to frame relay switch 124. When there is heavy traffic through router 112, the throughput of all of the packets are delayed equally, regardless of the importance of the data contained in the packets. A similar situation may occur at site 102.

Besides congestion possibly occurring at output port 138, congestion can occur further down the path toward a packet's destination, for example at egress link 140. Frame relay frames transmitted from frame relay switches 124 and 126 arrive at frame relay switch 128. Frame relay switches, such as frame relay switch 128, typically have egress access links that have a lower bandwidth than the sum of the bandwidths of the ingress access links. As a result, congestion can occur at egress link 140 of frame relay switch 128 when a relatively large number of frames arrive from frame relay switches 124 and 126. Furthermore, the throughput of each of the frames arriving at frame relay switch 128 is degraded equally, regardless of the importance of the data contained in the packet. Similar problems may result when sending data to sites 100 and 102.

Therefore, there exists a need in the art for a network that allows critical data to receive preference over non-critical data at points of congestion throughout the network to provide a guaranteed throughput for the critical data.

SUMMARY OF THE INVENTION

The present invention provides a network having increased throughput and minimal delay for critical data because a network typically contains congestion points. The present invention provides a method of transmitting data across such a network. The method includes the step of receiving a plurality of Internet protocol (IP) packets each of which contains data and priority information at a first router. The data contained in the IP packets is then encapsulated into frame relay packets containing the priority information. The frame relay frames are transmitted from the first router to a frame relay network in a manner determined by the priority information included in the frame relay frames. The frame relay frames are then transmitted across a frame relay network to a second router in a manner determined by the priority information included in the frame relay frames. The frame relay frames may be transmitted over more than one permanent virtual circuit.

In one embodiment of the invention, each of the permanent virtual circuits is used to transmit frame relay frames having predetermined priority information. Alternatively, each permanent virtual circuit may be used to transmit frame relay frames having predetermined priority information when a congestion condition exists.

The present invention may also include the steps of converting the frame relay frames arriving at the second router into Internet protocol packets having the priority information and transmitting the Internet protocol packets from the second router toward a destination location in a manner determined by the priority information included in the Internet protocol packets.

In another embodiment, frame relay frames are received at a frame relay egress switch and transmitted to the second router over more than one permanent virtual circuit.

The advantages of the present invention may also be provided by a computer network. The computer network may include a first router that receives packets containing data and priority information, a frame relay network containing a frame relay egress switch, a first permanent virtual circuit coupled between the first router and the frame relay egress that is used to carry frames having priority information corresponding to a first level of priority and a second permanent virtual circuit coupled between the first router and the frame relay egress that is used to carry frames having priority information corresponding to a second level of priority. The computer network may also include a second router, a third permanent virtual circuit coupled between the frame relay egress switch and the second router that is used to carry frames having priority information corresponding to the first level of priority, and a fourth permanent virtual circuit coupled between the frame relay egress switch and the second router that is used to carry frames having priority information corresponding to the second level of priority.

Other features and advantages of the invention will become apparent with reference to the following detailed description and the figures.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Figure 1:
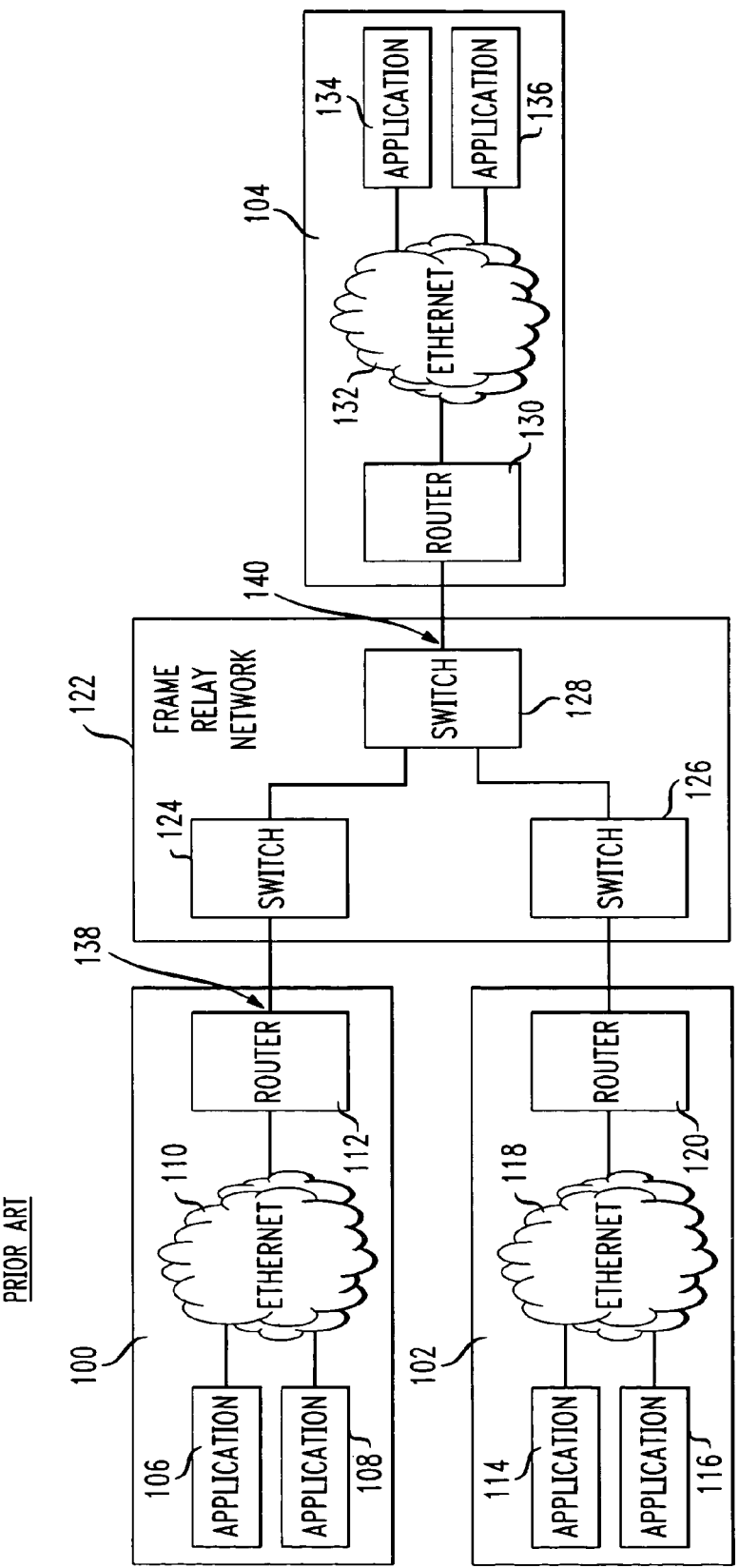
FIG. 1 is a schematic diagram of a conventional network.
Figure 2:
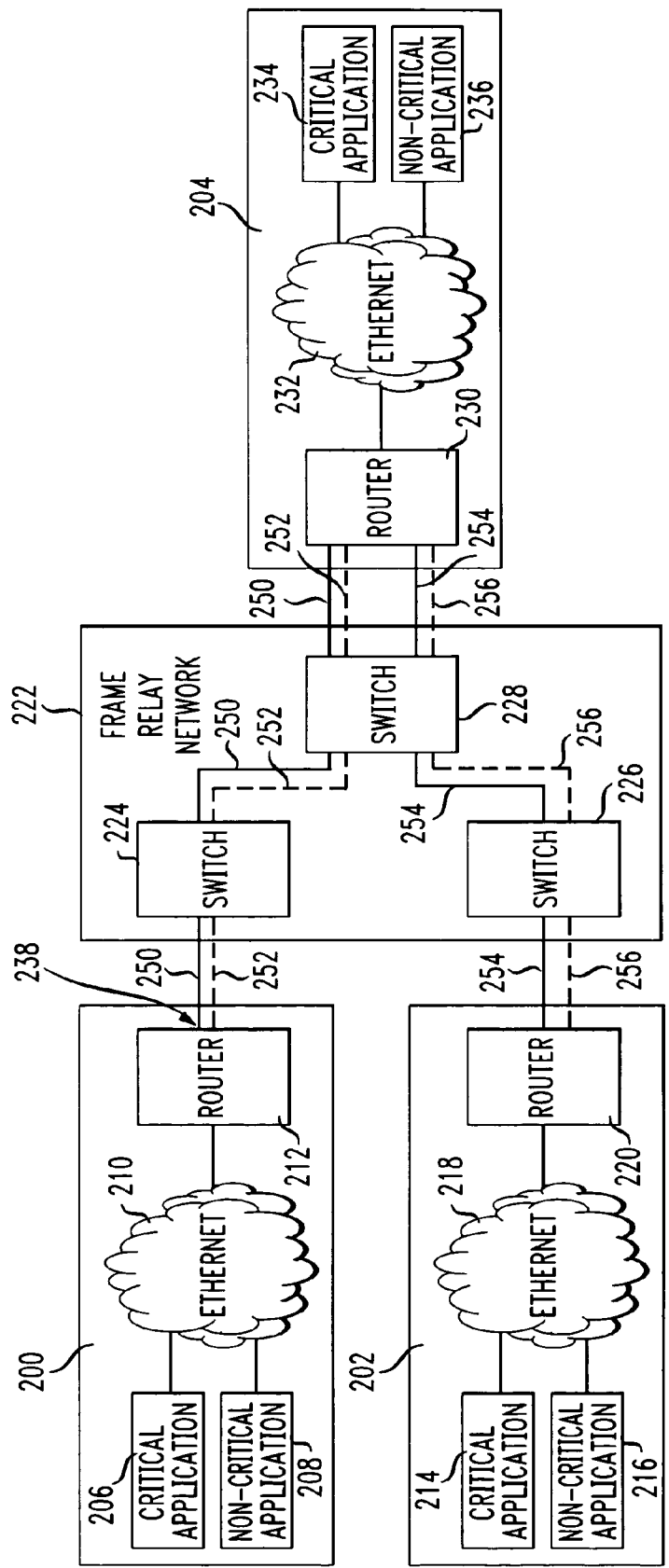
FIG. 2 is a schematic diagram of a network having increased throughput in accordance with the present invention.

FIG. 2 shows a network having minimal delay for critical data in accordance with a preferred embodiment of the invention. A first site 200 may contain a critical application 206 and a non-critical application 208, each of which transmits data to an Ethernet 210. Applications 206 and 208 may comprise a wide mix of applications, such as those typically used by businesses. Critical applications may include applications that require a predetermined throughput for optimal operation. For example, critical application 206 may comprise an application that sends time sensitive information, such as information for trading stocks. Critical application 206 may alternatively comprise an application that sends data that must be received within a predetermined time period, such as an application for sending voice data over a computer network. An example of a non-critical application may be an application for sending low priority electronic mail messages over a computer network. A single critical application 206 and non-critical application 208 are shown at site 200 for illustration purposes only. One skilled in the art will appreciate, that site 200, as well as sites 202 and 204, may contain numerous critical and non-critical applications that may reside on numerous computers at each site.

The transmission of packets from sites 200 and 202 to site 204 will be described with the understanding that the advantages of the present invention may be obtained when data is transmitted between any of the sites. Internet protocol (IP) packets may be generated at applications 206 and 208 and transmitted to router 212 via Ethernet 210. Router 212 may then classify each IP packet as either critical or non-critical. There are several mechanisms that router 212 may use for classifying packets. In one embodiment of the invention, the classification may be based on IP source and/or destination address of the packet. For example all data transmitted to and/or from a chief executive officer's computer may be designated as high priority. Alternatively, a port address of a computer can be used for the classification. Data leaving some ports may be designated as high priority and data leaving other ports may be designated as low priority. A user or system operator at site 200 may designate certain applications as critical and others as non-critical. Information in the packet header, such as the type of service (TOS) field can also be used to classify packets. One skilled in the art will appreciate that the above list includes only some of the information that can be used to classify packets. Other types of information, such as protocol information can also be used.

FIG. 2 shows an embodiment where sites 200 and 202 are each connected to site 204 by a pair of PVCs. Sites 200 and 202 can also be connected to each other. The output port 238 of router 212 is connected to a critical permanent virtual circuit (PVC) 250 and non-critical PVC 252 in the direction of site 204. During times of congestion, critical IP packets arriving at router 212 may receive priority processing. Router 212 encapsulates critical IP packets into frame relay frames having critical designations and may include policy routing computer code for causing the critical frame relay frames to be transmitted to frame relay switch 224 via critical PVC 250. Furthermore, router 212 may add a data link connection identifier (DLCI) to each of the frames. A DLCI of 1 may correspond to high priority and a DLCI of 2 may correspond to low priority. The DLCIs may be used by frame relay egress switch 228 in a manner described below. Non-critical packets may be transmitted from router 212 to frame relay switch 224 via non-critical PVC 252.

Therefore, during times of congestion, critical packets arriving at router 212 may be transmitted to frame relay switch 224 via critical PVC 250 faster than non-critical packets arriving at router 212 are transmitted to frame relay switch 224 via non-critical PVC 252. As a result, critical packets have a greater throughput through router 212 during times of congestion. Similar processing may occur at sites 202 and 204 by the corresponding components.

The present invention may also minimize the delay created at egress frame relay switches. The transmission of packets from sites 200 and 202 to site 204 will be described with the understanding that the advantages of the present invention may be obtained when data is transmitted between any of the sites. Critical frames arriving at egress frame relay switch 228 via critical PVCs 250 and 254 may receive priority processing during times of congestion. Priority processing may include absolute or relative priority processing. Relative priority processing maybe in the form of service limits. Alternatively, the priority of processing may also be based on DLCIs included in frames. As a result of applying priority processing to the critical frames, the throughput of critical frames through frame relay switch 228 is greater than the throughput of non-critical frames during times of congestion.

The combination of priority processing by routers and by frame relay switches results in critical data receiving priority processing from one end of the network through the other end of the network during times of congestion. Providing priority processing to critical data traveling across the network in either direction allows for priority processing of application responses and TCP acknowledgments, which optimizes the utility of the network. While FIG. 2 illustrates an embodiment showing priority processing in both directions across the network, the present invention may also be used to apply priority processing in a single direction. It may be advantageous to apply priority processing in a single direction when a given network is most likely to encounter congestion in only one direction. In particular, priority processing in a single direction may be applied to networks that include a data center or server farm.

In one embodiment of the invention, critical frames are always transmitted via critical PVCs and non-critical frames are always transmitted via non-critical PVCs to minimize the processing required at each router or frame relay switch. Alternatively, critical and non-critical frames may be transmitted over either PVC during times of non-congestion to optimize the throughput of the network during times of non-congestion. Furthermore, two classifications of data are shown for illustration purposes only. Any number of classifications may be used. For example, sites 200 and 202 may be connected to each other via three PVC used to carry frames have three priority levels.

While the present invention has been described in connection with the illustrated embodiments, it will be appreciated and understood that modifications may be made without departing from the true spirit and scope of the invention. For example, the present invention may be used with packet having a format other than frame relay.

What is claimed is:

1. A method of transmitting data across a network comprising the steps of receiving a plurality of Internet protocol packets each of which contains data and priority information at a first router;

encapsulating the data contained in the Internet protocol packets into frame relay frames containing the priority information;

transmitting the frame relay frames from the first router to a frame relay network in a manner determined by the priority information included in the frame relay frames; and transmitting the frame relay frames across a frame relay network to a second router in manner determined by the priority information included in the frame relay frames wherein the step of transmitting the frame relay frames from the first router comprises transmitting the frame relay frames over a group of more than one permanent virtual circuit, and the group of permanent virtual circuits includes at least one circuit designated to carry frames containing critical information and at least one circuit designated to carry frames containing non-critical information.

2. A method of transmitting data across a network comprising the steps of receiving a plurality of Internet protocol packets each of which contains data and priority information at a first router;

encapsulating the data contained in the Internet protocol packets into frame relay frames containing the priority information;

transmitting the frame relay frames from the first router to a frame relay network in a manner determined by the priority information included in the frame relay frames;

transmitting the frame relay frames across a frame relay network to a second router in manner determined by the priority information included in the frame relay frames converting the frame relay frames arriving at the second router into Internet protocol packets having the priority information; and transmitting the Internet protocol packets from the second router toward a destination location in a manner determined by the priority information included in the Internet protocol packets.

3. A method of transmitting data across a network comprising the steps of receiving a plurality of Internet protocol packets each of which contains data and priority information at a first router;

encapsulating the data contained in the Internet protocol packets into frame relay frames containing the priority information;

transmitting the frame relay frames from the first router to a frame relay network in a manner determined by the priority information included in the frame relay frames; and transmitting the frame relay frames across a frame relay network to a second router in manner determined by the priority information included in the frame relay frames wherein the priority information of each Internet protocol packet arriving at the first router is a function of an address of each Internet protocol packet.

* * * * *